United States Patent [19]
Rivet et al.

[11] Patent Number: 5,909,364
[45] Date of Patent: Jun. 1, 1999

[54] DEVICE FOR SWITCHING BETWEEN AN A.C. VOLTAGE AND A D.C. VOLTAGE

[75] Inventors: Bertrand Rivet; Benoît Peron, both of Tours, France

[73] Assignee: SGS-Thomson Microelectronics S.A., Saint Genis, France

[21] Appl. No.: 08/828,379

[22] Filed: Mar. 27, 1997

[30] Foreign Application Priority Data

Mar. 29, 1996 [FR] France .................................. 96 04271

[51] Int. Cl.$^6$ .................................................. H02M 5/42
[52] U.S. Cl. .............................. 363/89; 323/299; 323/908
[58] Field of Search ................... 363/84, 85, 86, 363/89; 323/299, 282, 908

[56] References Cited

U.S. PATENT DOCUMENTS

| | | | |
|---|---|---|---|
| 5,428,267 | 6/1995 | Peil ........................................ | 363/17 X |
| 5,430,637 | 7/1995 | Buck ........................................... | 363/89 |

FOREIGN PATENT DOCUMENTS

| | | | |
|---|---|---|---|
| A-24 29 686 | 1/1976 | Germany .......................... | H02J 3/14 |
| A-2 048 596 | 12/1980 | United Kingdom ........... | H03K 17/00 |
| WO-A-95 24076 | 9/1995 | WIPO ............................ | H03K 17/16 |

OTHER PUBLICATIONS

Patent Abstracts of Japan, vol. 018, No. 345 (E–1571), Jun. 29, 1994 & JP–A–06 086553 (Sony Corp.).

*Primary Examiner*—Peter S. Wong
*Assistant Examiner*—Y. J. Han
*Attorney, Agent, or Firm*—Wolf, Greenfield & Sacks, P.C.

[57] ABSTRACT

The present invention relates to a switching device for selecting a voltage between an a.c. voltage and a d.c. voltage using the ground as a reference, meant to be controlled by a two-state signal, using the ground as a reference and of the same sign as the d.c. voltage, including means for adjusting the turn-on time of a switch in the selection of the d.c. voltage.

20 Claims, 2 Drawing Sheets

5,909,364

DEVICE FOR SWITCHING BETWEEN AN A.C. VOLTAGE AND A D.C. VOLTAGE

BACKGROUND OF THE INVENTION

1. Field of the Invention

The present invention relates to a switch for closing a discharge path of a storage capacitor of a rectified power supply. It more specifically applies to the implementation of a switch meant to be controlled by a two-state signal that fluctuates between a reference potential, e.g., ground, and a high state (which has the same sign as the rectified power supply).

However, although the present invention is described hereafter in the context of this particular application, it should be noted that the present invention also provides a switch for selecting a voltage from between an a.c. voltage and a d.c. voltage (using the ground as a reference), which is meant to be controlled by a two-state signal also using the ground as a reference and having a high state that is the same sign as the d.c. voltage.

2. Discussion of the Related Art

FIG. 1 shows an example of a rectifier associated with a storage capacitor, for example, for a power converter such as a switch-mode supply system.

The rectifier generally includes a diode bridge 1 connected to an a.c. power supply (terminals E1, E2), for example, the mains a.c. voltage. A storage capacitor C is positioned between output terminals S1 and S2, respectively, of the rectifier to provide a rectified d.c. supply Vout. In the example shown in FIG. 1, capacitor C is associated with separate charge and discharge paths. The charge path is comprised of a diode D connected between a first terminal of the capacitor and terminal S2 (generally the ground). The discharge path is comprised of a thyristor Th mounted between the first terminal of the capacitor and the ground. Thyristor Th is a thyristor with its anode gate connected to a circuit 2 issuing a two-state control signal, using the ground as a reference.

FIG. 2 illustrates the operation of the rectifier as shown in FIG. 1. This drawing shows, in the form of timing diagrams, the course of voltage Vout according to a control signal Vg of thyristor Th, the on-periods of thyristor Th being illustrated in a third timing diagram.

It is assumed that at a time t0, capacitor C is charged and the voltage Vin issued by the rectifier is at its maximum Vm. Voltage Vout is also at its maximum Vm and thyristor Th is blocked. Voltage Vin starts to decrease in the second half of the halfwave and, at a time t1, block 2 sends a positive pulse (Vcc) for controlling thyristor Th. At this time, the thyristor turns on and voltage Vout abruptly jumps to the maximum charge level of capacitor C corresponding, for example, to the maximum amplitude Vm of voltage Vin. Assuming that a load is connected to terminals S1 and S2, capacitor C discharges until voltage Vin becomes once again higher than the voltage across the capacitor (time t2), that is, during the following halfwave. At that time, the thyristor blocks and capacitor C recharges via diode D1. This operation is repeated at each halfwave of the rectified a.c. voltage.

In some applications, the abrupt voltage jump at time t1 (i.e., at the turning-on of thyristor Th) raises problems. Such problems arise, for example, if voltage Vout is meant for a circuit synchronized on the mains, for example, a system for improving the power factor in a television receiver where signal Vout is used as a basis for the horizontal scanning of the screen.

In this type of application, the turning-on of thyristor Th might be seen on the image, the abrupt voltage jump creating interference at the mains frequency.

More generally, this problem appears in the switching between two voltage sources, i.e. a.c. and d.c sources.

SUMMARY OF THE INVENTION

The present invention overcomes this disadvantage by providing a device with a smooth switching upon turn-on.

The present invention provides such a device with a switching time that is adjustable independently from the control circuit.

To achieve these objects, the present invention provides a switching device for selecting a voltage between an a.c. voltage and a d.c. voltage using the ground as a reference, meant to be controlled by a two-state signal, using the ground as a reference and having a high state that is the same sign as the d.c. voltage, including means for adjusting the turn-on time of a switch during the selection of the d.c. voltage. The a.c. voltage is rectified, the d.c. voltage is supplied by a storage capacitor charged by the rectified a.c. voltage, and the switch constitutes a discharge path for the storage capacitor. The switch is a P-channel MOS transistor, the means for adjusting the turn-on time of the switch being comprised of a circuit for damping the trailing edges of the control signal.

According to an embodiment of the present invention, the damping circuit includes a first capacitor mounted in series with a first resistor between a terminal receiving the control signal and a gate of the MOS transistor, and a first diode mounted in parallel with a second capacitor and a second resistor between the gate of the MOS transistor and the ground.

According to an embodiment of the present invention, the damping circuit includes a third resistor mounted in parallel with the first resistor, the second resistor being mounted in series with a second diode.

According to an embodiment of the present invention, the value of the first capacitor is substantially higher than the value of the second capacitor.

According to another embodiment of the invention, a circuit for causing either an a.c. output voltage or a d.c. output voltage to be issued by a pair of output leads includes a switching circuit and a control circuit. The switching circuit is configured to receive a control signal and, responsive to the control signal, to cause the a.c. output voltage or the d.c. output voltage to be issued by the pair of output leads. The control circuit is coupled to the switching circuit and provides the switching circuit with the control signal. When the d.c. output voltage is selected, the control signal periodically transitions between first and second states, and transitions in the control signal (that cause the d.c. output voltage to be selected) are dampened.

According to another aspect of the invention, the d.c. output voltage uses ground as a reference, and one of the first and second states of the control signal includes a voltage of a same sign with respect to ground as the d.c. output voltage.

According to another aspect, the switching circuit includes a MOS transistor arranged to receive the control signal on a gate thereof, and current electrodes of the transistor are connected so as to permit a storage capacitor to discharge therethrough to provide the d.c. output voltage to the pair of output leads when the d.c. output voltage is selected.

According to another embodiment of the invention, a supply circuit capable of being switched to provide either an a.c. output voltage or a d.c. output voltage comprises a pair of input leads to receive an a.c. input voltage, and a pair of output leads to issue the selected output voltage. The supply circuit further includes a switching circuit arranged to receive a control signal and to cause either the a.c. output voltage or the d.c. output voltage to be issued by the pair of output leads, and a control circuit (coupled to the switching circuit) to provide the switching circuit with the control signal. When the d.c. output voltage is selected, the control signal periodically transitions between first and second states, and transitions in the control signal that cause the d.c. output voltage to be selected are dampened.

According to another embodiment, a method for selecting either an a.c. output voltage or a d.c. output voltage (to be provided at an output of an electronic circuit), comprises the steps of: (a) supplying a control signal to a switching circuit, the control signal periodically switching between a high and a low state when the d.c. output voltage is selected, with transitions between the high and low states being dampened, and (b) responsive to the control signal, employing the switching circuit to cause the selected output voltage to be issued at the output.

According to an additional aspect, the step of supplying the control signal may include supplying the control signal such that the first state constitutes a reference voltage and the second state constitutes a voltage having a same sign, in reference to the reference voltage, as the d.c. output voltage.

A characteristic of the present invention is to implement the switch by means of a P-channel MOS power transistor associated with a circuit for damping the trailing edges of the control signal. Indeed, the switching rate is not adjustable and its switching time thus cannot be slowed down to avoid disturbances in the load.

The use of a P-channel transistor is linked with the fact that the control signal is positive and that the d.c. voltage issued by the capacitor is itself positive and uses the ground as a reference.

These objects, characteristics and advantages as well as others, of the present invention, will be discussed in detail in the following non-limiting description of a specific embodiment in relation with the accompanying drawings.

DETAILED DESCRIPTION

Figure 1:
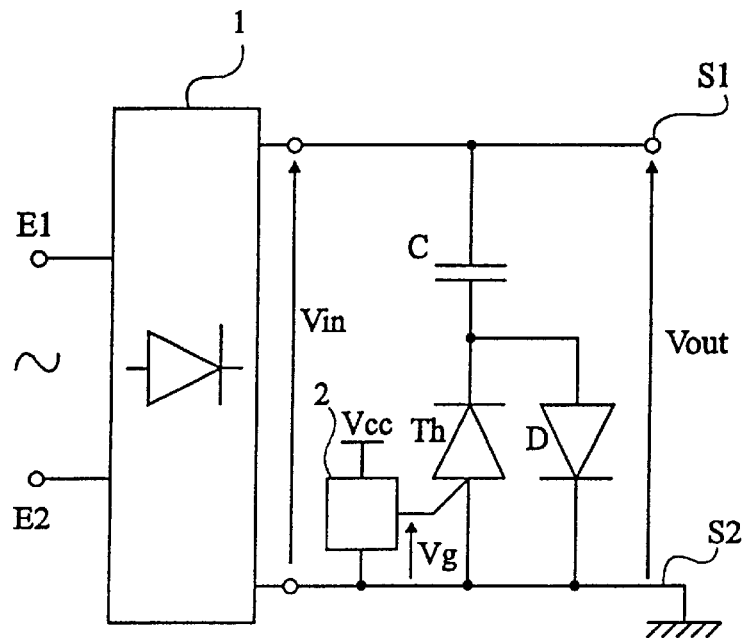
FIGS. 1 and 2, previously described, are meant to show the state of the art and the problem to solve.
Figure 2:
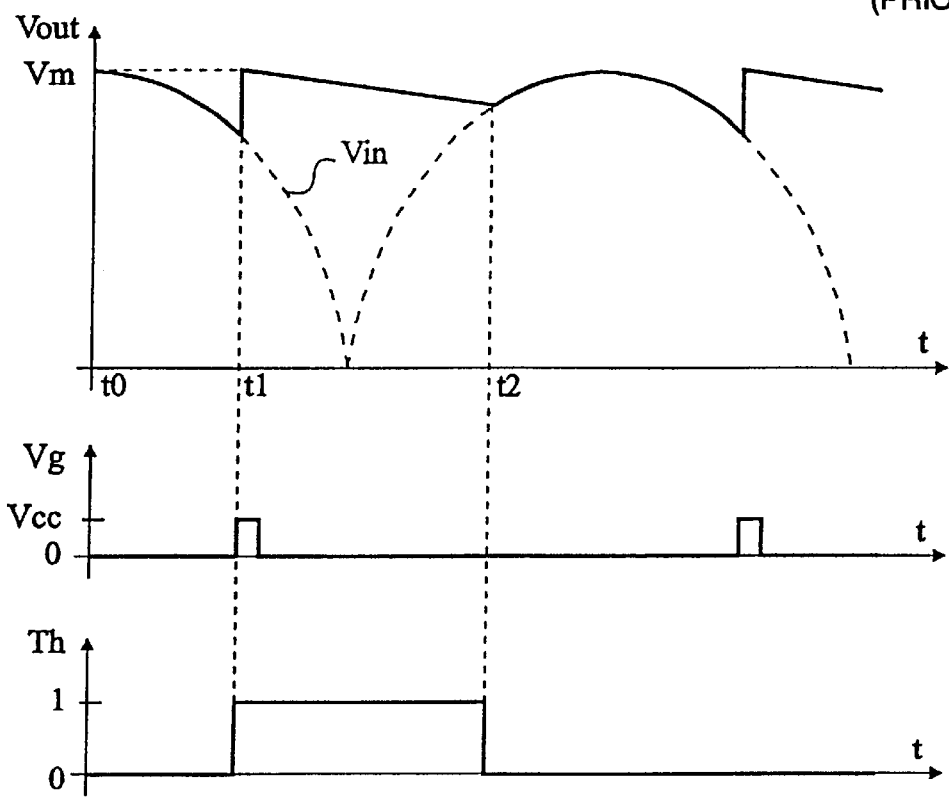
Figure 4:
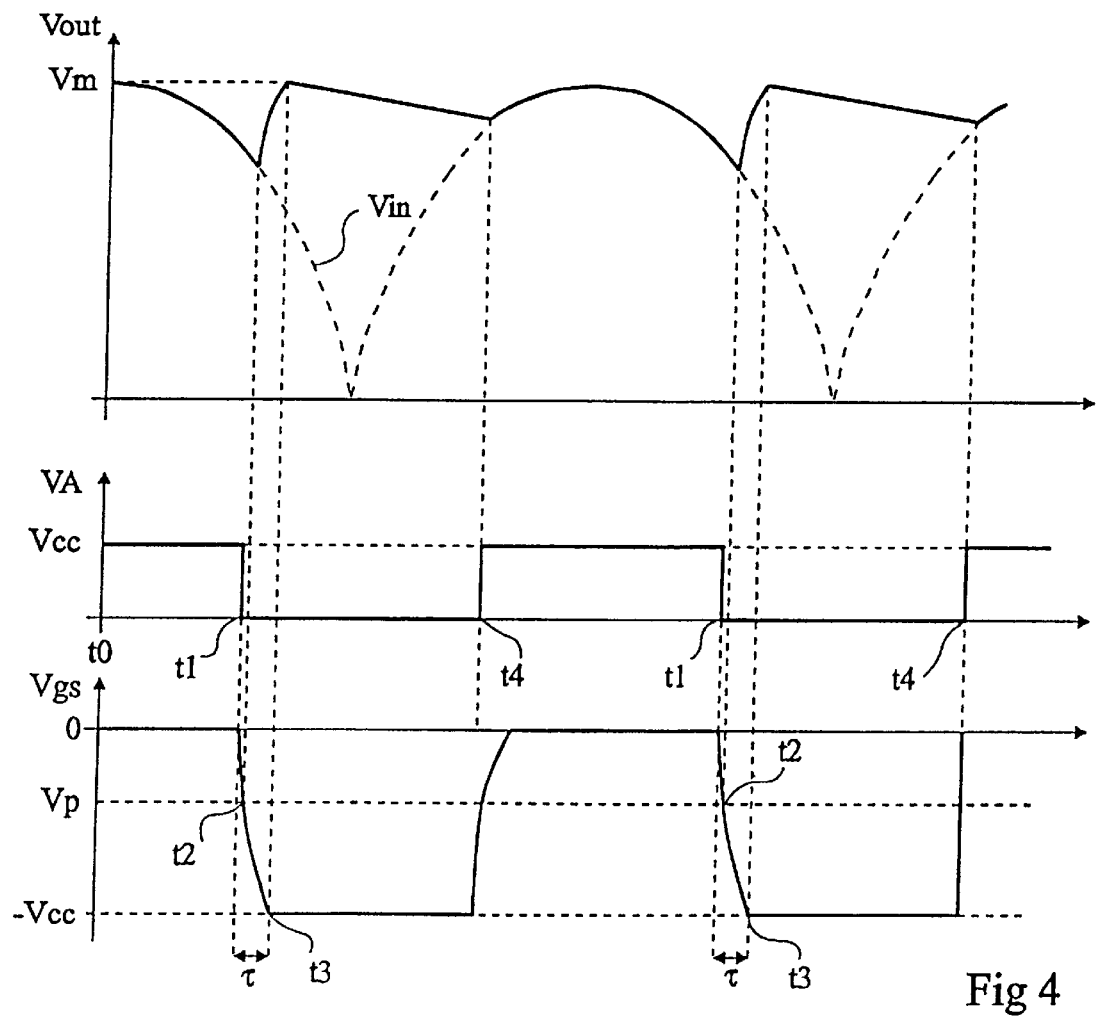
FIG. 4 illustrates, in the form of timing diagrams, the operation of the device shown in FIG. 3.

For clarity, the same components have been referred to by the same references in the different drawings. Similarly, the timing diagrams of FIGS. 2 and 4 are not to scale.

Figure 3:
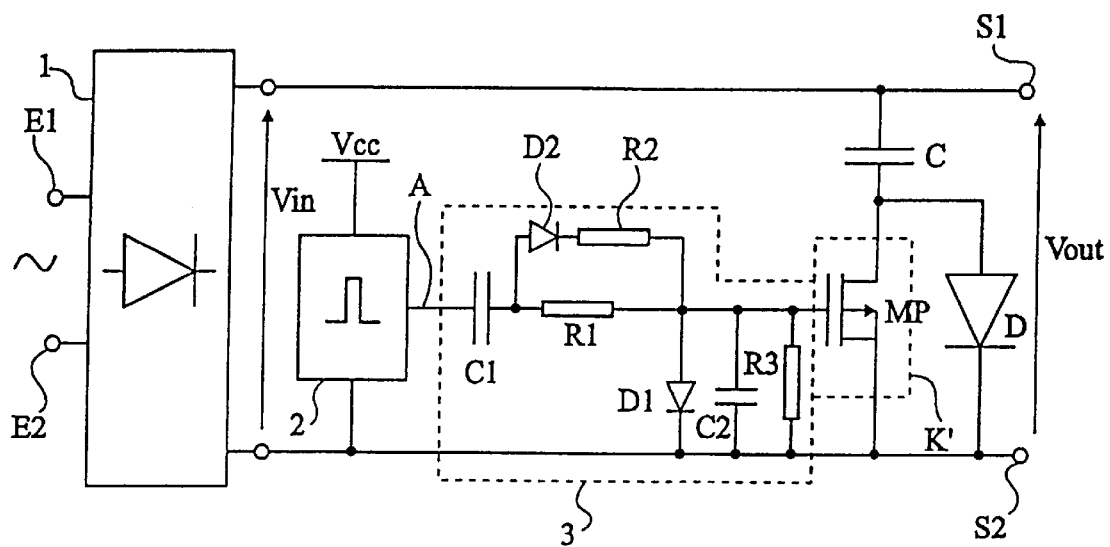
FIG. 3 shows an embodiment of a smooth switching device according to the present invention.

FIG. 3 shows an embodiment of a switching device according to the present invention, applied to an a.c. voltage rectifier.

As previously, the rectifier includes a diode bridge 1, a storage capacitor C, a switch K' and a block 2 for controlling the switch.

According to the present invention, switch K' is comprised of a P-channel MOS power transistor mounted in series with capacitor C. The drain of the transistor is connected to a first terminal of capacitor C while its source is connected to an output terminal S2 of the rectifier, the potential of which constitutes a reference potential (generally the ground), both for the load (not shown) and for control block 2.

A circuit 3 for damping the trailing edges of the control signal issued by block 2 is interposed between block 2 and the gate of MOS transistor MP.

Circuit 3 includes a first capacitor C1 in series with a resistor R1, between an output A of block 2 and the gate of transistor MP. A second capacitor C2, as well as a diode D1 and a resistor R3, are connected in parallel between the gate of transistor MP and the ground.

The operation of the switching device will be described hereafter with reference to FIG. 4, which shows, in the form of timing diagrams, the shape of the voltage Vout between terminals S1 and S2, of the gate potential Vgs of transistor MP and of the voltage $V_A$ of the signal issued by block 2.

Control signal $V_A$ is provided so as to be grounded when switch K' is to be turned on and to be at a positive potential (Vcc) when switch K' is to be turned off.

When the potential of output A of block 2 is equal to Vcc (times to and t1), capacitor C1 charges via resistor R1 and diode D1. Transistor MP is blocked and voltage Vout follows voltage Vin.

When potential $V_A$ becomes zero (time t1), due to a state switching of the control signal for turning on switch K', capacitor C2 charges through resistor R1 under the effect of the discharge of capacitor C1, the circuit being closed by resistor R1. Potential Vgs decreases, it corresponds with the increasing negative charge on capacitor C2. When this potential becomes lower than the pinch-off voltage Vp of transistor MP (time t2), the latter enters conduction. The gate-source voltage (Vgs) of transistor MP keeps on decreasing until a time t3 where it reaches −Vcc (complete charge of capacitor C2). Thus, the evolution of the voltage across the MOS transistor is progressive.

It should be noted that diode D1 is reverse-biased during the charge of capacitor C2.

When potential $V_A$ becomes positive again (time t4), due to a state switching of the control signal, capacitor C2 discharges through resistor R3.

Since capacitor C2 has a low value, its time constant is low. The gate of the MOS transistor is thus brought back to the ground. Diode D1 becomes forward-biased again and capacitor C1 can charge again.

The discharge of capacitor C2 guarantees that the evolution of gate-source voltage Vgs of the MOS transistor starts from 0 volts for each turning-on.

The switching time τ(t3−t1) at the turning-on of MOS transistor MP is set by resistors R1 and R3 and capacitor C2, while it is immediate upon turn-off, due to the charge path of capacitor C through diode D.

The value of capacitor C1 should be very large with respect to the value of capacitor C2, so that a sufficient charge is available for capacitor C1 to enable the charge of capacitor C2. As a specific example, the value of capacitor C1 is around 10 microfarads while the value of capacitor C2 is around 100 nanofarads.

It should be noted that capacitor C1 must have enough time to charge to Vcc for each off period of the MOS transistor, that is, while potential $V_A$ is positive. It can however happen that, according to the duty ratio of the control signal issued by block 2, capacitor C1 does not have time to charge entirely, according to the value selected for resistor R1 which, as mentioned previously, conditions switching time constant τ.

A first solution includes making a compromise between the slowing down of the turning on of switch K', performed by cell R1C2, and the need to completely charge capacitor C1 through resistor R1.

A second preferred solution is, according to the present invention, to position a diode D2 and resistor R2 in parallel with resistor R1.

Thus, the charge rate of capacitor C1 is increased, since resistors R1 and R2 are in parallel during the charge. However, the turn-on time constant τ of switch K40 is not altered, since, due to diode D2, the sole resistor R1 intervenes to close the circuit for charging capacitor C2.

The two parameters (charge rate of capacitor C1 and turn-on time of switch K') are thus set independently from each other.

An advantage of the present invention is that the switching device so constituted suppresses any disturbance in the charge during the turning-on of switch K'.

Another advantage of the present invention is that the lengthening of the switching time only intervenes upon turn-on, switch K' always turning off at once to enable the supply of the load by rectified a.c. voltage Vin and the charge of capacitor C through diode D when it is no longer sufficiently charged. Thus, the charge of capacitor C is not disturbed by the switch according to the present invention.

Of course, the present invention is likely to have various alterations, modifications, and improvements which will readily occur to those skilled in the art, especially as concerns the selection of the values of resistances R1, R2 and R3 and of capacities C1 and C2.

Further, while reference has been made in the preceding description to a particular application of the present invention to a rectifier, the present invention applies to any switching device for selecting a voltage among an a.c. voltage and a d.c. voltage by means of a control signal of the same sign as the d.c. voltage, for supplying a load, the operation of which is synchronous with the a.c. voltage.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switching device for selecting a voltage between a first rectified a.c. voltage and a second d.c. voltage supplied by a storage capacitor charged by the rectified a.c. voltage, and using the ground as a reference, meant to be controlled by a two-state signal, using the ground as a reference and of the same polarity with respect to the ground as said d.c. voltage, including a circuit for damping the trailing edges of the control signal, for adjusting the turn on time of a switch during the selection of the d.c. voltage, said switch being a P-channel MOS transistor, and constituting a discharge path for the storage capacitor.

2. A switching device according to claim 1, wherein the damping circuit includes a first capacitor connected in series with a first resistor between a terminal receiving the control signal and a gate of the MOS transistor, and a first diode, a second capacitor and a second resistor, connected in parallel, coupled between the gate of the MOS transistor and the ground.

3. A switching device according to claim 2, wherein the damping circuit includes a third resistor connected in parallel with the first resistor, the third resistor being connected in series with a second diode.

4. A switching device according to claim 2 or 3, wherein the value of the first capacitor is substantially higher than the value of the second capacitor.

5. A circuit for selectively permitting a d.c. voltage stored by a storage capacitor charged by a rectified a.c. voltage to be provided by a pair of nodes, comprising:
    a switching circuit arranged to receive a control signal on a control input thereof wherein, when the control signal is in a first state, the switching circuit causes a discharge path for the storage capacitor to be established between the pair of nodes, and when the control signal is in a second state, the switching circuit prevents the discharge path for the storage capacitor from being established between the pair of nodes; and
    a control circuit coupled to the switching circuit to provide the switching circuit with the control signal, transitions in the control signal from the second state to the first state being dampened so that a conductance of the discharge path is increased more gradually than the conductance of the discharge path would increase if the transitions from the second state to the first state were not dampened.

6. The circuit as claimed in claim 5, wherein:
    the d.c. voltage uses ground as a reference, and
    one of the first and second states of the control signal includes a voltage of a same polarity with respect to ground as the d.c. voltage.

7. The circuit as claimed in claim 5, wherein the control circuit includes:
    a control block to produce a non-dampened two-state signal; and
    a damping circuit coupled to the control block to receive the non-dampened two-state signal and to produce the control signal.

8. The circuit as claimed in claim 7, wherein the damping circuit includes:
    a first capacitor, in series with a first resistor, coupled between an output termial of the control block and the control input of the switching circuit; and
    a first diode, in parallel with a second capacitor and a second resistor, coupled between the control input of the switching circuit and the ground.

9. The circuit as claimed in claim 8, wherein:
    the switching circuit includes a P-channel MOS transistor coupled in series with the storage capacitor, and
    the control input of the switching circuit includes a gate of the MOS transistor.

10. The circuit according to claim 9, wherein the damping circuit further includes a third resistor, in series with a second diode, coupled in parallel with the first resistor.

11. The circuit according to claim 8, wherein a capacitance of the first capacitor is substantially greater than a capacitance of the second capacitor.

12. The circuit as claimed in claim 5, wherein the switching circuit includes a MOS transistor, coupled in series with the storage capacitor, arranged to receive the control signal on a gate thereo.

13. The circuit as claimed in claim 12, wherein the MOS transistor includes a P-channel MOS transistor.

14. The circuit as claimed in claim 5, wherein the switching circuit is arranged such that the rectified a.c. voltage is provided between the pair of nodes when the control signal is in the second state.

15. A method for selectively permitting a d.c. voltage stored by a storage capacitor charged by a rectified a.c. voltage to be provided between a pair of nodes, comprising the steps of:

supplying a control signal to a switching circuit that selectively establishes a discharge path for the storage capacitor between the pair of nodes, the control signal periodically switching between a first state and a second state, transitions from the first state to the second state being dampened so that a conductance of the discharge path is increased more gradually than the conductance of the discharge path would increase if the transitions from the first state to the second state were not dampened;

when the control signal is in the first state, preventing the discharge path for the storage capacitor between the pair of nodes from being established; and when the control signal is in the second state, establishing the discharge path for the storage capacitor between the pair of nodes.

16. The method according to claim 15, wherein:

the step of supplying the control signal includes supplying the control signal such that the first state constitutes a reference voltage and the second state constitutes a voltage having a same polarity, in reference to the reference voltage, as the d.c. voltage.

17. The method as claimed in claim 15, further comprising a step of:

when the control signal is in the first state, permitting the rectified a.c. voltage to be provided between the pair of nodes.

18. A method for establishing a discharge path between a pair of nodes for a capacitor charged by a rectified a.c. voltage, comprising steps of:

(a) establishing a conductance of the discharge path for the capacitor at a more gradual rate than the conductance of the discharge path could be established by either one of a thyristor, coupled in series with the capacitor, receiving a transitioning signal at a gate thereof, and a transistor, coupled in series with the capacitor, receiving a square wave at a control electrode thereof; and (b) deestablishing the discharge path for the capacitor.

19. The method as claimed in claim 18, further comprising a step of:

repeating the steps (a) and (b) continuously.

20. The method as claimed in claim 18, further comprising a step of:

permitting the rectified a.c. voltage to be provided between the pair of nodes when the discharge path for the capacitor is deestablished.

* * * * *